United States Patent [19]

Wood et al.

[11] Patent Number: 4,685,215
[45] Date of Patent: Aug. 11, 1987

[54] SLIP STICK

[76] Inventors: George N. Wood, 76 Flanders Rd., Niantic, Conn. 06357; George Spector, 233 Broadway, RM 3615, New York, N.Y. 10007

[21] Appl. No.: 825,633

[22] Filed: Feb. 3, 1986

[51] Int. Cl.⁴ ............................................. G01B 3/08
[52] U.S. Cl. ..................................................... 33/161
[58] Field of Search ................. 33/161, 137 R, 169 R, 33/464

[56]     References Cited
    U.S. PATENT DOCUMENTS

| | | | |
|---|---|---|---|
| 144,264 | 11/1873 | Discher | 33/161 |
| 224,401 | 2/1880 | Derickson | 33/161 |
| 1,031,517 | 7/1912 | Boyce | 33/161 |
| 1,050,733 | 1/1913 | Greathead | 33/161 |
| 1,272,976 | 7/1918 | McLucas | 33/161 |

Primary Examiner—Harry N. Haroian

[57]  ABSTRACT

An extensible measuring tool for measuring lengths of lumber to be cut is provided and consists of two sliding bar members, a bracket for guiding the two sliding bar members together, a clamping screw assembly, a clamping screw assembly for locking the two sliding bar members together and a hook member mounted to distal end of one of the sliding bar members so that the hook member can be placed on one end of the lumber to be cut.

1 Claim, 6 Drawing Figures

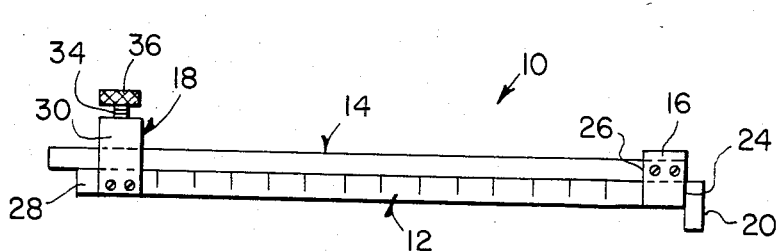
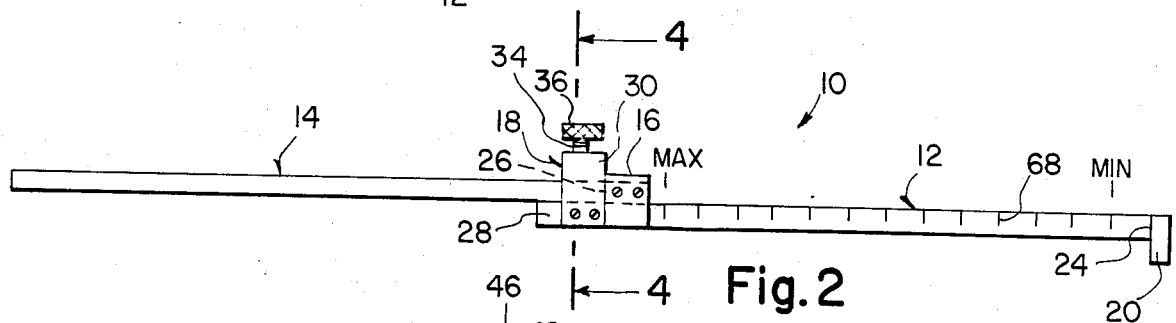
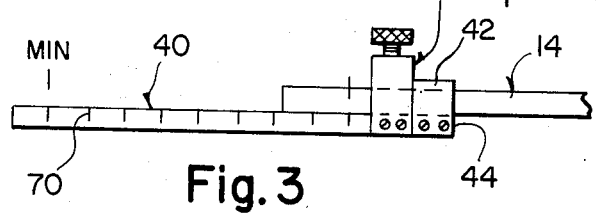
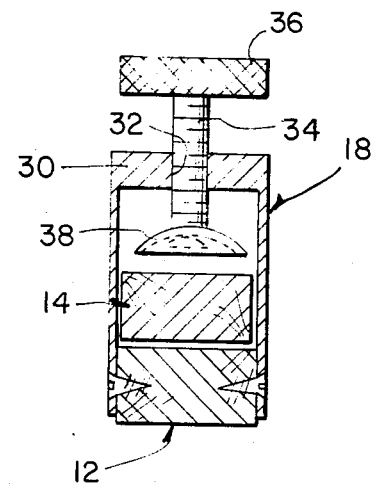
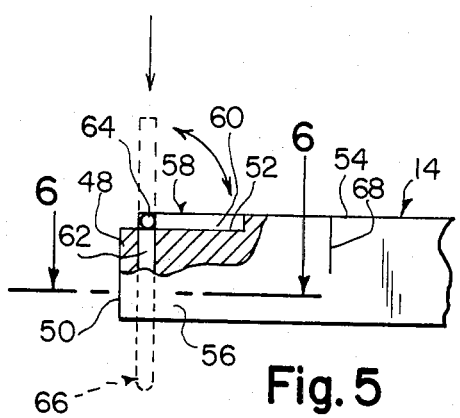
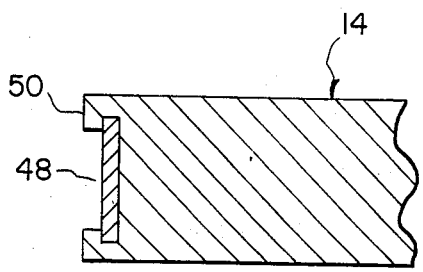

SLIP STICK

BACKGROUND OF THE INVENTION

The instant invention relates generally to measuring devices and more specifically it relates to an extensible measuring tool.

Numerous measuring devices have been provided in prior art that are adapted to measure lengths by being manually adjusted to the lengths. For example, U.S. Pat. Nos. 2,270,355; 3,154,859 and 4,462,166 all are illustrative of such prior art. While these units may be suitable for the particular purpose to which they address, they would not be as suitable for the purposes of the present invention as heretofore described.

SUMMARY OF THE INVENTION

A principle object of the present invention is to provide an extensible measuring tool that will overcome the shortcomings of the prior art devices.

Another object is to provide an extensible measuring tool that will measure many pieces of lumber, such as studs, at the same length and can be used when hanging doors, setting door jams and caseings.

An additional object is to provide an extensible measuring tool that contains a double stop member at end of the left sliding bar member to engage with the edge of a door or board in order to accurately measure the same.

A further object is to provide an extensible measuring tool that is simple and easy to use.

A still further object is to provide an extensible measuring tool that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a side view of the invention in a closed position.

FIG. 2 is a side view of the invention in an extended position.

FIG. 3 is a side view of an extension sliding bar member attached to the left sliding bar member.

FIG. 4 is an enlarged cross sectional view taken along line 4—4 in FIG. 2 showing details of the clamping screw assembly.

FIG. 5 is an enlarged side view with parts broken away of the end of the left sliding bar member showing a modification being a double stop.

FIG. 6 is a cross sectional view taken along line 6—6 in FIG. 5 showing the track therein.

DETAILED DESCRIPTION OF THE PREFERRED EMBODIMENTS

Turning now descriptively to the drawings, in which similar reference characters denote similar elements throughout the several views, FIGS. 1 and 2 illustrate an extensible measuring tool 10 for measuring lengths of lumber (not shown) to be cut.

The tool 10 consists of a first sliding bar member 12, a second sliding bar member 14, a U-shaped bracket 16 for guiding the first and second sliding bar members together, a clamping screw assembly 18 for locking the first and second sliding bar members together and a hook member 20 mounted to distal end 24 of the first sliding bar member 12. The hook member can be placed on one end of the lumber to be cut.

The U-shaped bracket 16 is mounted to proximal end 26 of the second sliding bar member 14 in which the first sliding bar member 12 slides therein.

The clamping screw assembly 18 is mounted to proximal end 28 of the first sliding bar member 12 in which the second sliding bar member 14 slides therein and can be clamped into a locking position.

As best seen in FIG. 4 the clamping screw assembly 18 includes an inverted U-shaped bracket 30 that has a top threaded hole 32 therein. A threaded clamping screw 34 that has a knurled head 36 is threaded into threaded hole 32 in the bracket 30. A bell washer 38 is affixed to end of the screw 34. When the screw is threaded downwardly the bell washer 38 will make contact with the second sliding bar member 14.

FIG. 3 shows an extension sliding bar member 40. An inverted U-shaped bracket 42 is mounted to proximal end 44 of the extension sliding bar member 40 in which the second sliding bar member 14 slides therein. The bracket 42 guides the extension and the second sliding bar members together.

A second clamping screw assembly 46 is mounted near proximal end 44 of the extension sliding bar member 40 in which the second sliding bar member 14 slides therein and can be clamped into a locking position. The second clamping screw assembly 46 is identical to the clamping screw assembly 18 and is used for locking the extension and the second sliding bar members together.

FIGS. 5 and 6 further illustrate the second sliding bar member 14 having a transverse passage 48 forming a track 50 and a parallel notch 52 extending from top 54 at distal end 56 therein.

A removeable stop 58 is provided which comprises two plates 60 and 62 hinged therebetween at 64. The stop 58 is positioned within the track 50 and the notch 52 for providing a hook member 66 shown in dotted at distal end 56 of the second sliding bar member 14, for use in referencing the distal end 56 when it is inconvenient to reference hook 20 of the first bar 12.

The first sliding bar member 12 can have a scale 68 running from right to left while the extension sliding bar member 40 can have a scale 70 running from left to right so that the second sliding bar member 14 can be easily positioned therebetween.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An extensible measuring tool for measuring lengths of lumber to be cut, said tool comprising:
    (a) a first sliding bar member with a right to left scale;
    (b) a second sliding bar member;
    (c) guide means for guiding said first and said second sliding bar members together;
    (d) means for locking said first and said second sliding bar members together; and (e) a hook member mounted to distal end of said first sliding bar member so that said hook member can be placed on one end of said lumber to be cut; wherein said guide means is a U-shaped bracket mounted to proximal end of said second sliding bar member in which said first sliding bar member slides therein, wherein said locking means is a clamping screw assembly mounted to proximal end of said first sliding bar member in which said second sliding bar member slides therein and can be clamped into a locking position, wherein said clamping screw assembly includes;
(a) an inverted U-shaped bracket having a top threaded hole therein;
(b) a threaded clamping screw having knurled head, said screw threads into said threaded hole in said bracket; and
(c) a bell washer affixed to end of said screw so that when said screw is threaded downwardly said bell washer will make contact with said second sliding bar member; further comprising:
(a) an extension sliding bar member with a scale going left to right;
(b) means for guiding said extension and said second sliding bar members together; and
(c) means for locking said extension and said second sliding bar members together, wherein said second guide means is an inverted U-shaped bracket mounted to proximal end of said extension sliding bar member in which said second sliding bar member slides therein, wherein said second locking means is a second clamping screw assembly mounted near proximal end of said extension sliding bar member in which said second sliding bar member slides therein and can be clamped into a locking position, wherein said second clamping screw assembly includes:
(a) a second inverted U-shaped bracket having a top threaded hole therein;
(b) a second threaded clamping screw having a knurled head, said second screw threads into said threaded hole in said second bracket; and
(c) a second bell washer affixed to end of said second screw so that when said second screw is threaded downwardly said second bell washer will make contact with said second sliding bar member, in combination with removeable hook means at the distal end of said second bar, wherein said removeable hook means comprises:
(d) said second sliding bar member having a transverse passage forming a transverse track and a notch parallel to said second bar extending along the top of said distal end intersecting said passage;
(e) a hinged stop being of two plates hinged therebetween so that one of said plates can be removeable positioned within said track and the other of said plates in said notch.

\* \* \* \* \*